United States Patent [19]

Tonks

[11] Patent Number: 5,476,224
[45] Date of Patent: Dec. 19, 1995

[54] VARIABLE AREA OUTLET OF A GAS TURBINE ENGINE DISCHARGE NOZZLE

[75] Inventor: Robert C. Tonks, Bridgewater, England

[73] Assignee: Rolls-Royce PLC, London, England

[21] Appl. No.: 269,531

[22] Filed: Jul. 1, 1994

[30] Foreign Application Priority Data

Jul. 2, 1993 [GB] United Kingdom ............. 9313664

[51] Int. Cl.⁶ ................................. B64C 15/00
[52] U.S. Cl. .................... 239/265.37; 244/23 D
[58] Field of Search .............. 239/265.19, 265.25, 239/265.33, 265.37, 265.39, 455, 265.35; 60/271, 230, 232; 244/12.4, 12.5, 23 D

[56] References Cited

U.S. PATENT DOCUMENTS

| | | | |
|---|---|---|---|
| 2,927,424 | 3/1960 | Hyde | 239/455 |
| 2,974,480 | 3/1961 | Kurti | 239/455 |
| 3,643,868 | 2/1972 | McMurtry | 239/265.39 |
| 4,361,281 | 11/1982 | Nash | 239/265.37 |
| 4,778,109 | 10/1988 | Jourdain et al. | 239/265.27 |
| 5,120,005 | 6/1992 | Reedy | 239/265.39 |

FOREIGN PATENT DOCUMENTS

| | | |
|---|---|---|
| 0091786 | 10/1983 | European Pat. Off. . |
| 2058932 | 4/1981 | United Kingdom . |
| 2230239 | 10/1990 | United Kingdom . |
| 2238278 | 5/1991 | United Kingdom . |
| 2238516 | 6/1991 | United Kingdom . |

Primary Examiner—Karen B. Merritt
Attorney, Agent, or Firm—Oliff & Berridge

[57] ABSTRACT

A variable area exit for a gas turbine engine discharge nozzle having a generally rectangular outlet includes a pair of rotatable flaps which extend between opposing sidewalls of the nozzle. Each of the flaps are provided with a profiled cam track which cooperates with a cam roller mounted on an axially moveable shroud ring. The shroud ring is coaxially disposed about the nozzle axis so that translation of the shroud causes the flaps to rotate and the nozzle exit area to alter.

5 Claims, 4 Drawing Sheets

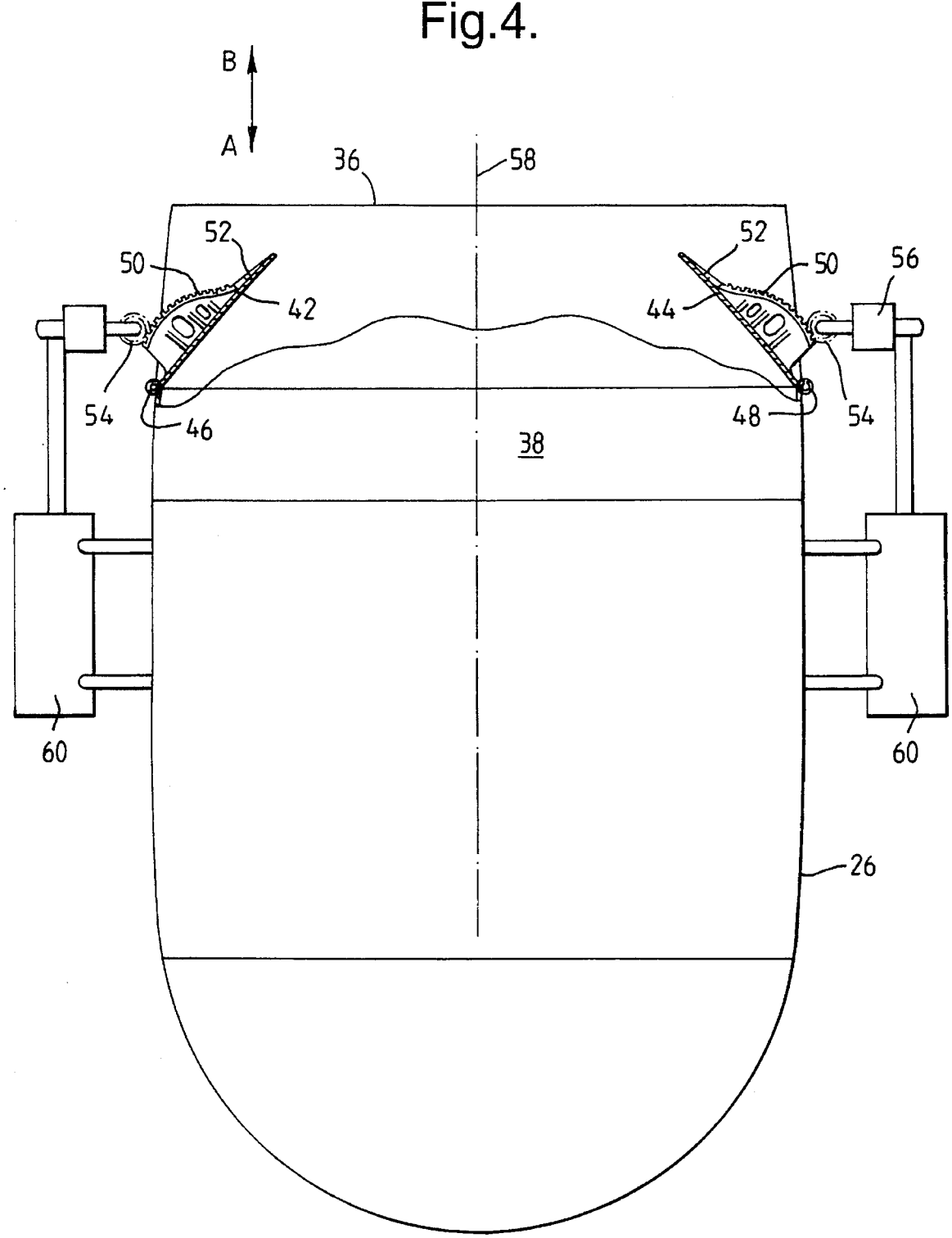

VARIABLE AREA OUTLET OF A GAS TURBINE ENGINE DISCHARGE NOZZLE

FIELD OF THE INVENTION

This invention concerns a variable area outlet for a fluid flow duct and in particular a variable area nozzle outlet for a gas turbine engine.

BACKGROUND OF THE INVENTION

Modern gas turbine engines often utilise variable area nozzles as a means for optimising engine performance at off-design conditions.

Although known prior art variable area nozzles have proved effective in achieving the degree of area variation required, they have done so at the expense of increased weight and complexity. This is of particular concern in the field of vertical and short take-off and landing (V/STOL) aircraft engine applications which utilise rotatable nozzles to direct engine thrust. With these nozzles the mechanism for varying the area of the outlet must be simple to operate, capable of being operated independently of the mechanism for rotating the nozzle, and above all lightweight in construction so as not to impose unacceptable loads on the mechanism for supporting and rotating the nozzle.

The prior art nozzles have generally been of axisymmetric configuration having an outlet flow periphery defined by an annular array of pivotal flaps. This has necessitated interflap sealing between adjacent nozzle flaps, the effect of which has been to add considerable weight to the nozzle construction.

An objective of the present invention is, therefore, to provide a lightweight variable area outlet, and in particular a variable outlet suitable for a rotatable nozzle in a V/STOL powerplant application.

SUMMARY OF THE INVENTION

According to the invention a rotatable nozzle includes a variable area outlet for a fluid flow duct comprising;

a pair of axially extending parallel sidewalls, a single pair of opposing elements, cam member and an axillary translatable actuator ring. The single pair of opposing elements extend between the sidewalls and combine with the sidewalls to define an outlet flow periphery. A first of the elements being mounted for rotation about a first axis orthogonal to the sidewalls and a second of the elements being mounted for rotation about a second axis parallel to the first axis. The cam member being fixed in relation to each of the elements, and an axially translatable actuator ring engages the cam member of each element so that translation of the ring causes the elements to rotate and the flow area to alter.

BRIEF DESCRIPTION OF THE DRAWINGS

The invention will now be described, by way of example only, with reference to the accompanying drawings, in which:

FIG. 4 shows the nozzle of the present invention in the same sectional view as FIG. 3 but with the nozzle in a second configuration.

DETAILED DESCRIPTION OF THE PREFERRED EMBODIMENT

Figure 1:
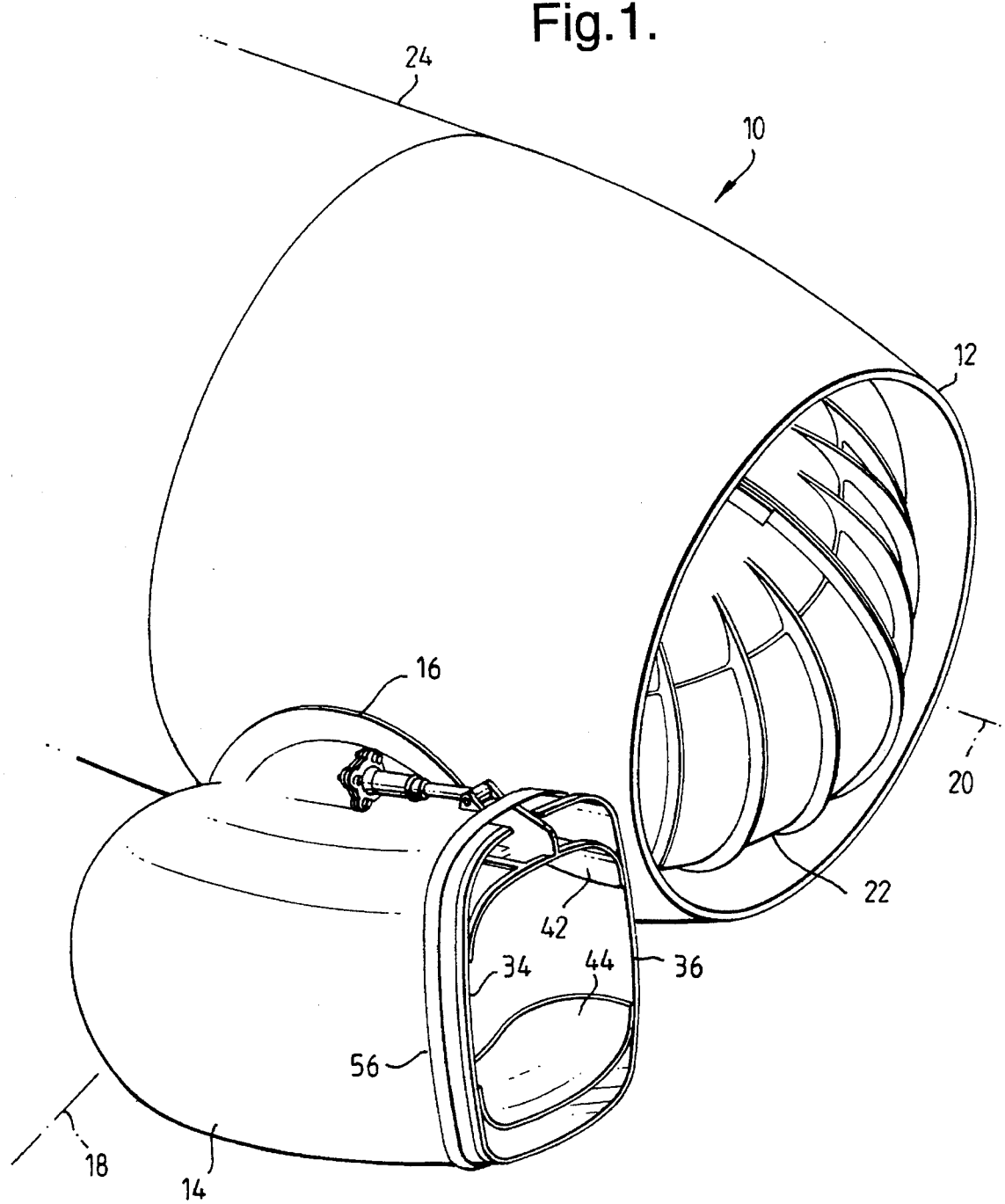
FIG. 1 shows a rotatable nozzle having a variable area outlet according to a general embodiment of the invention.

Referring to FIG. 1 there is shown a gas turbine engine exhaust section 10 for a V/STOL powerplant application. The engine includes a main axial discharge nozzle 12 for directing engine gases rearwards during forward flight, and a pair of side mounted rotatable lift nozzles 14 for vectoring engine gases during periods of vertical and transitional flight. Nozzles 14 are each mounted in bearings 16 for rotation about an axis 18 orthogonal to the main engine axis 20. A diverter valve 22 of a generally well known type is further provided for selectively directing the engine gases exclusively to either the side mounted lift nozzles 14 or the axial thrust nozzle 12.

Figure 2:
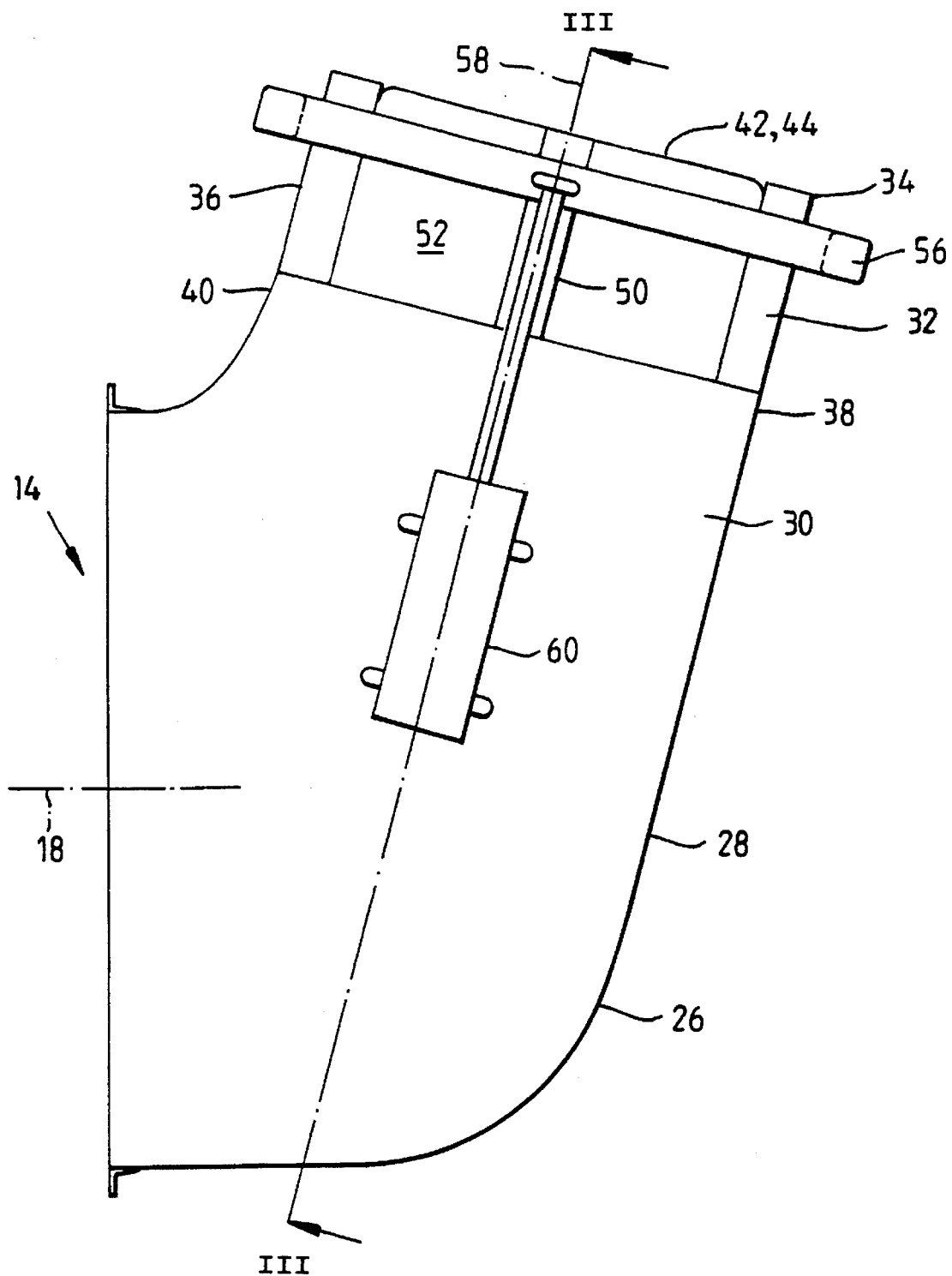
FIG. 2 shows in plan view a rotatable nozzle of the type shown in FIG. 1 having a variable area outlet according to the invention.
Figure 3:
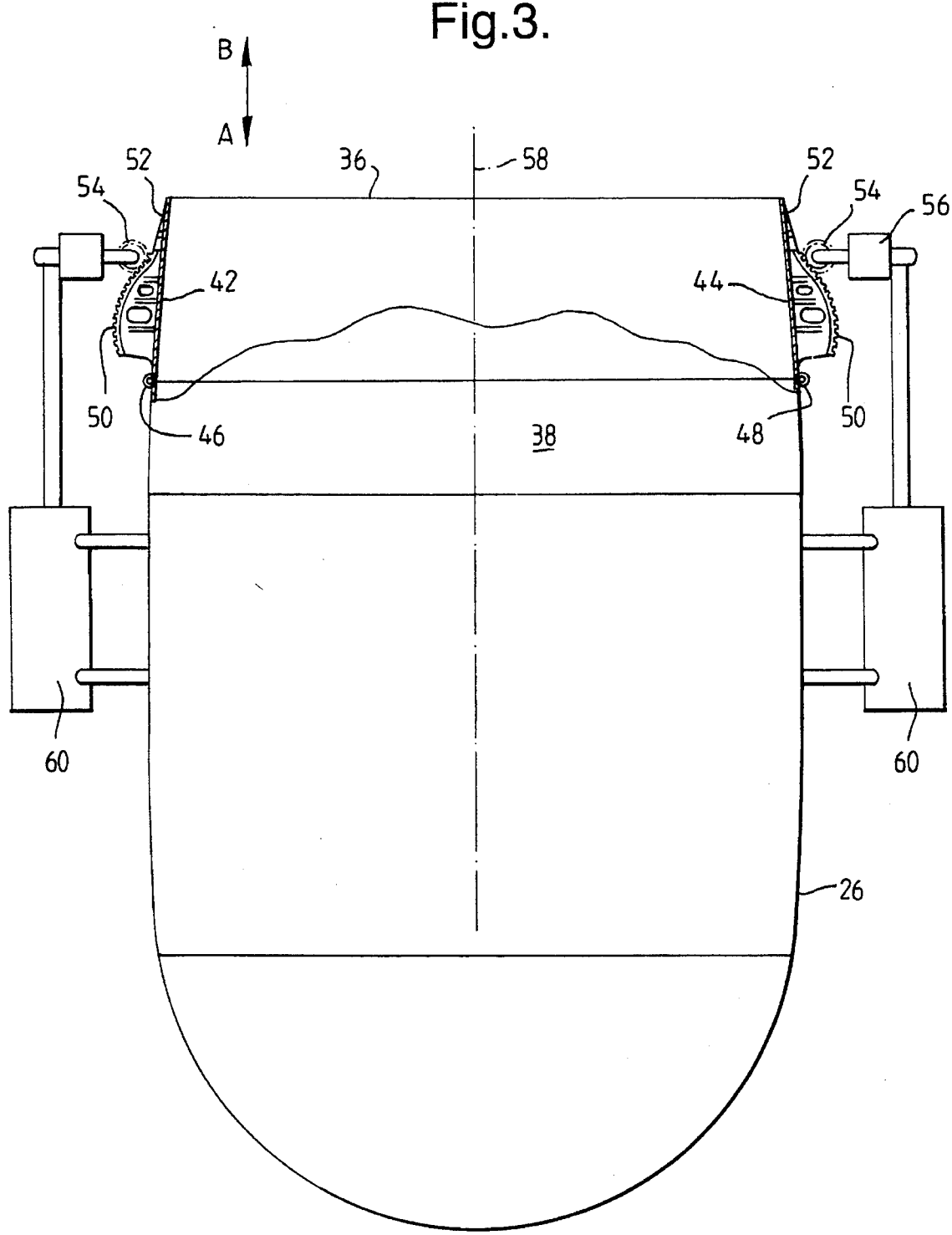
FIG. 3 shows a sectional view, in the direction of arrows 3—3, of the rotatable nozzle shown in FIG. 2.

Referring now to FIGS. 2 to 4, nozzle 14 comprises a part toroidal wall 26 which defines a gas flow duct 28 having a generally rectangular downstream section 30, and a variable area convergent outlet 32 which also has a generally rectangular section. The nozzle outlet 32 comprises a pair of parallel sidewalls 34,36 which extend downstream from opposing sides 38,40 of the duct to define lateral flow boundaries, and a pair of rotatable flap elements 42,44 which extend spanwise in spaced apart relation between sidewalls 34,36 to define top and bottom flow boundaries. Elements 42,44 are mounted for rotation at the downstream end of duct 28 about respective spanwise axes 46,48 which are disposed orthogonally to the duct axis 58. The elements sealingly engage the sidewalls along their edges. The edges may be liped (not shown) so that they engage the sidewalls 34,36 of duct the over a increased area.

As shown each of the elements 42,44 is provided with a profiled cam trackway 50 extending from its outer surface 52. The respective trackways 50 are each engaged by a roller element 54 which defines a corresponding cam follower means. The cam roller elements 54 are each mounted to an axially moveable shroud ring 56 which is coaxially disposed about duct axis 58. The shroud ring 56 is itself supported by a pair of actuators 60 which are attached to opposing sides of the duct. The actuators are arranged so as to translate the shroud ring backwards and forwards, in the direction of arrows A and B, along duct axis 58.

It is to be appreciated that the shroud ring 56 restrains the elements 42,44 about their respective axes 46,48 such that, in use, the gas loads acting on the elements are reacted by the ring 56 and not the nozzle actuators 60. This enables actuators of relatively lightweight construction to be used.

In operation the maximum nozzle exit area is obtained by translating the shroud ring to the position shown in FIG. 3. This causes the cam rollers 54 to translate along the respective cam tracks 50 such that the elements 42,44 rotate to the positions shown.

To obtain a nozzle of minimum exit area shroud ring 56 is translated rearwards by energisation of actuators 60 to the position shown in FIG. 4. This causes elements 42,44 to rotate about their respective axes 46,48 to define a minimum nozzle exit area.

Clearly the dimensions of the nozzle exit area can be varied progressively between the maximum and minimum configurations shown simply by positioning the shroud ring in some intermediate position.

Although this invention has been described with reference to a side mounted rotatable nozzle for a gas turbine engine it is to be appreciated that it is not restricted to such an application. Indeed it is equally applicable to nozzles such as the main axial thrust nozzle described above. It is to be appreciated also that the invention is not restricted to gas turbine engine applications, but is applicable to any type of fluid flow duct requiring a simple variable area exit means.

I claim:

1. A gas turbine engine discharge nozzle comprising:

a pair of axially extending parallel sidewalls, a single pair of opposing elements which extend between the sidewalls and which combine with the sidewalls to define an outlet flow periphery, a first of the elements being mounted for rotation about a first axis orthogonal to the sidewalls, and a second of the elements being mounted for rotation about a second axis parallel to the first axis, cam means fixed in relation to each of the elements, an axially translatable actuator ring which engages the cam means of each element so that translation of the ring causes the elements to rotate and the flow area to alter, and bearing means for rotatably mounting the nozzle about an axis remote from said outlet flow periphery.

2. A discharge nozzle as claimed in claim 1 wherein the elements and sidewalls define a generally rectangular flow outlet.

3. A discharge nozzle as claimed in claim 1 wherein the elements are each rotatably mounted towards the downstream end of the nozzle.

4. A discharge nozzle as claimed in claim 1 wherein the elements define a convergent nozzle section.

5. A discharge nozzle according to claim 1, further including a gas turbine engine having a main longitudinal axis, the nozzle being provided on the engine and mounted for rotation about an axis transverse to the longitudinal axis.

* * * * *